US010958111B2

(12) United States Patent
Covic et al.

(10) Patent No.: US 10,958,111 B2
(45) Date of Patent: Mar. 23, 2021

(54) POWER TRANSFER AND LEAKAGE FLUX CONTROL

(71) Applicant: Auckland UniServices Limited, Auckland (NZ)

(72) Inventors: Grant Anthony Covic, Mount Albert (NZ); Seho Kim, Mt. Eden (NZ); Feiyang Lin, Birkenhead (NZ)

(73) Assignee: Auckland UniServices Limited, Auckland (NZ)

( * ) Notice: Subject to any disclaimer, the term of this patent is extended or adjusted under 35 U.S.C. 154(b) by 0 days.

(21) Appl. No.: 16/322,528

(22) PCT Filed: Aug. 1, 2017

(86) PCT No.: PCT/NZ2017/050106
§ 371 (c)(1),
(2) Date: Feb. 1, 2019

(87) PCT Pub. No.: WO2018/026288
PCT Pub. Date: Feb. 8, 2018

(65) Prior Publication Data
US 2020/0203992 A1 Jun. 25, 2020

(30) Foreign Application Priority Data
Aug. 1, 2016 (NZ) ........................ 722771

(51) Int. Cl.
*H02J 50/90* (2016.01)
*H02J 7/00* (2006.01)
(Continued)

(52) U.S. Cl.
CPC .............. *H02J 50/90* (2016.02); *B60L 53/12* (2019.02); *H01F 5/00* (2013.01); *H01F 38/14* (2013.01);
(Continued)

(58) Field of Classification Search
CPC .. H02J 50/10; H02J 50/90; H02J 50/70; H02J 7/0042; H02J 7/04; B60L 53/12; H01F 5/00; H01F 38/14
See application file for complete search history.

(56) References Cited

U.S. PATENT DOCUMENTS

2013/0270921 A1  10/2013  Boys et al.
2015/0155095 A1   6/2015  Wu et al.
(Continued)

FOREIGN PATENT DOCUMENTS

WO  WO-2008140333 A2  11/2008
WO  WO-2010090539 A1   8/2010
(Continued)

OTHER PUBLICATIONS

"International Application No. PCT/NZ2017/050106, International Preliminary Report on Patentability dated Feb. 5, 2019", (Feb. 5, 2019), 10 pgs.
(Continued)

*Primary Examiner* — Robert L Deberadinis
(74) *Attorney, Agent, or Firm* — Schwegman Lundberg & Woessner, P.A.

(57) ABSTRACT

Magnetic coupling structures for wireless power transfer include overlapping coils which are configured to provide improved flux patterns. Control methods are used to determine the variation in coupling factor relative to alignment between the primary magnetic coupling structures and energise one or more coils of the primary magnetic coupling structure dependent on the relative alignment of the coupling structures to maximise coupling.

20 Claims, 10 Drawing Sheets

(51) Int. Cl.
  *H02J 50/10* (2016.01)
  *H02J 50/70* (2016.01)
  *B60L 53/12* (2019.01)
  *H01F 5/00* (2006.01)
  *H01F 38/14* (2006.01)
  *H02J 7/04* (2006.01)

(52) U.S. Cl.
  CPC .............. *H02J 7/0042* (2013.01); *H02J 7/04* (2013.01); *H02J 50/10* (2016.02); *H02J 50/70* (2016.02)

(56) References Cited

U.S. PATENT DOCUMENTS

2015/0364929 A1* 12/2015 Davis ...................... H01F 38/14
                                                    307/104
2016/0049798 A1    2/2016 Maikawa

FOREIGN PATENT DOCUMENTS

| WO | WO-2011016737 A1 | 2/2011 |
| WO | WO-2012018269    | 2/2012 |
| WO | WO-2013122483    | 8/2013 |
| WO | WO-2018026288 A1 | 2/2018 |

OTHER PUBLICATIONS

"International Application No. PCT/NZ2017/050106, International Search Report and Written Opinion dated Nov. 6, 2017", (Nov. 6, 2017), 15 pgs.

\* cited by examiner (a)

(b)

(c)

POWER TRANSFER AND LEAKAGE FLUX CONTROL

PRIORITY CLAIM TO RELATED APPLICATIONS

This application is a U.S. national stage filing under 35 U.S.C. § 371 from International Application No. PCT/NZ2017/050106, filed on 01 Aug. 2017, and published as WO2018/026288 on 08 Feb. 2018, which claims the benefit under 35 U.S.C. 119 to Ne Zealand Application No. 722771, filed on 01 Aug. 2016, the benefit of priority of each of which is claimed herein, and which applications and publication are hereby incorporated herein by reference in their entirety.

FIELD OF THE INVENTION

This invention relates to inductive power transfer (IPT) magnetic structures, circuits and systems which enable wireless power transfer over significant air gaps.

BACKGROUND

An important aspect of IPT systems is the design of the magnetic structures which are magnetically coupled in use to enable power to be transferred. The shape, size and materials within the magnetic structures determine the magnetic coupling between the primary structure and the secondary structure and the leakage magnetic flux generated by the IPT system. For an IPT system, the magnetic coupling directly influences the power transfer capabilities. The leakage magnetic flux is the magnetic flux that does not contribute to the power transfer of the IPT system. In the absence of careful system design, people or surrounding objects can be exposed to leakage flux, so guidelines have been developed to regulate potential exposure. The leakage magnetic flux from an IPT system should not exceed 27 uT according to ICNIRP guidelines. The impact of the magnetic structure on the power transfer capabilities and leakage magnetic flux is amplified in the setting of electric vehicle (EV) charging where the secondary is not guaranteed to be perfectly aligned with the primary.

Magnetic coupling structures can take many different forms, and may be provided with one or more coils for coupling (whether generating or receiving) magnetic flux. In many applications, one of which is EV charging, the magnetic coupling structures may be provided as relatively flat modules which are sometimes referred to as pads. The structures which are provided on the primary side of a system are referred to in this document as IPT or wireless primary coupling apparatus, or primary pads, or ground pads (for EV charging applications). The magnetic structure provided on the secondary side of the system (provided for example in an EV which is receiving power for the purposes of its operation and/or to charge a battery provided in the vehicle) is referred to as a secondary coupling apparatus, or vehicle pad, or secondary pad. It will be understood by the reader that, while this document refers to some specific applications such as EV systems, the subject matter disclosed is also applicable to IPT or wireless power transfer systems in general.

One form of magnetic coupling structure is a pad that has a single "circular", oval or polygonal shaped coil, such as that disclosed in international patent publication No. WO2008140333. Such structures or topologies are referred to in this document as circular pads, or CP.

A magnetic coupling structure for IPT systems is described in International Patent Publications WO2011016737 and WO2012018269. This uses two mutually decoupled coils, and may be considered to be a bipolar magnetic structural topology. For convenience, bipolar magnetic topologies such as those disclosed in WO2011016737 and WO2012018269 are referred to in this document as bipolar pads, or BPP.

A magnetic coupling structure for IPT systems has been proposed in International patent publication No. WO2013122483 which consists of three or more partially overlapping coils. The three partially overlapping coils are mutually decoupled with each other. For ease of reference, this structure is referred to in this document as a tripolar pad (TPP). Energising any one of the mutually decoupled coils in the TPP has negligible current induced in adjacent coils so the three coils within the same TPP can be considered independent of each other. By exploiting the independency of the three TPP coils, the TPP coils can be driven by three individual power supplies, where each of the power supplies can set the driving currents at any magnitudes or phases independently without impacting the driving currents in adjacent coils.

As mentioned above, there is a continuing need to reduce leakage flux which is applicable to the TPP structure, but also to IPT magnetic coupling structures generally. Furthermore, the presence of another magnetic coupling structure can cause some mutual coupling between the coils in BPP and TPP structures, and this can be problematic for efficient system operation.

These problems, along with the problem of efficient power transfer, are exacerbated under conditions in which the magnetic coupling structures are misaligned.

SUMMARY OF THE INVENTION

In one aspect there is provided a magnetic coupling structure for wireless power transfer comprising:
a plurality of flat coils, each coil comprising a plurality of turns of conductive material;
each coil having an overlap portion that overlaps the other coil, and a non-overlap portion;
the overlap portions being selected such that there is minimal mutual coupling between the coils;
and wherein a plurality of turns in the overlap portion have a greater relative spacing therebetween than those turns in the non-overlap portion.

In another aspect there is provided a magnetic coupling structure for wireless power transfer comprising:
a plurality of flat coils, each coil comprising a plurality of turns of conductive material;
each coil having an overlap portion that overlaps the other coil, and a non-overlap portion;
the overlap portions being selected such that there is minimal mutual coupling between the coils;
and wherein a plurality of the turns in the non-overlap portion have a lesser relative spacing therebetween than those turns in the overlap portion.

In one example the plurality of flat coils are provided in a first layer, and a magnetically permeable material provided in a second layer.

The permeable material may be arranged such that magnetic flux generated or received by a coil is predominantly directed away from the non-overlap portion of that coil. Preferably the magnetic flux is predominantly present in use in a central region of the structure and extending about the overlap portion.

In one example the permeable material extends beyond each coil. A first region of the permeable material is provided exteriorly of the non-overlap portion and a second region of the permeable material is provided exteriorly of the overlap portion. The area of the second region is greater than the area of the first region.

The spacing between adjacent turns in the non-overlap portion may vary. Only a sub-region of the non-overlap portion may have a lesser relative spacing therebetween than those turns in the overlap portion.

In one example adjacent turns or filars are spaced relatively more closely to each other in a part of the non-overlap portion nearest to an end or edge of the coupling structure.

In another aspect there is provided a method of determining mutual coupling between coils of a magnetic coupling structure for wireless power transfer, the method comprising:

energising a first coil of the flux coupling structure;

detecting the voltage or current induced in a second coil of the flux coupling structure from energisation of the first coil;

using the detected voltage or current to determine the mutual coupling between the first and second coils.

The method may further include detecting the voltage or current induced in a third coil of the flux coupling structure from energisation of the first coil;

using the detected voltage or current to quantify the mutual coupling between the first and third coils.

The method may further include energising the second coil and detecting the voltage or current induced in the third coil of the flux coupling structure from energisation of the first coil; using the detected voltage or current to quantify the mutual coupling between the second and third coils.

In another aspect there is provided a method of wireless power transfer, the method comprising the steps of:

energising a first coil of the flux coupling structure;

detecting a voltage or current induced in a second coil of the flux coupling structure from energisation of the first coil;

using the detected voltage or current to determine the mutual coupling between the first and second coils;

energising the first and/or second coils to provide a magnetic field for wireless power transfer dependent on the determined mutual coupling.

In another aspect there is provided a method for controlling an primary IPT circuit, the method comprising the steps of:

supplying a first current at a first phase angle to a first coil of the primary circuit;

detecting the power received by a secondary circuit from the first current;

determining an effective coupling factor, and;

using the effective coupling factor to determine a minimum primary supply for a given secondary power requirement.

The method may include the step of incrementing or decrementing the first current and/or the first phase angle until the effective coupling factor is maximised.

The method may include the steps of:

supplying a second current at a second phase angle to a second coil of the primary circuit;

detecting the power received by a secondary circuit from the second current, and;

determining the effective coupling factor.

The method may include the step of incrementing or decrementing the second current and/or the second phase angle until the effective coupling factor is maximised.

In another aspect there is provided a method for controlling a primary IPT circuit, the method comprising the steps of:

determining an optimal or near optimal effective coupling factor for a plurality of different relative locations of a secondary magnetic coupling structure relative to a primary magnetic coupling structure associated with the primary circuit;

detecting the location of the secondary magnetic coupling structure relative to the primary magnetic coupling structure, and;

controlling the primary supply dependent on determined effective coupling factor for the detected location.

The primary magnetic coupling structure may include multiple coils. In one example the multiple coils have minimal mutual coupling.

In another aspect there is provided a method for controlling a primary IPT circuit having a multiple coil primary magnetic coupling structure, the method comprising the steps of:

determining the variation in coupling factor relative to misalignment between the primary magnetic coupling structure and a secondary magnetic coupling structure;

energising one or more coils of the primary magnetic coupling structure dependent on the relative alignment of the coupling structures to maximise coupling.

The method may be used to maximise power transfer for a given misalignment.

The method may include energising the coils of the primary magnetic coupling structure in a polarised manner.

The method may include energising the coils of the primary magnetic coupling structure in a non-polarised manner.

In another aspect there is provided a method for controlling a primary IPX circuit having a multiple coil primary magnetic coupling structure, the method comprising the steps of:

detecting misalignment between a secondary magnetic coupling structure relative to a primary magnetic coupling structure;

energising one or more coils of the primary coupling structure in a polarised or non-polarised manner dependent on the detected misalignment.

The method may include determining the variation in coupling factor relative to misalignment between the primary magnetic coupling structure and a secondary magnetic coupling structure. Once the variation is known the method may include energising one or more coils of the primary magnetic coupling structure dependent on the relative alignment of the coupling structures to maximise coupling.

In another aspect there is provided a method for controlling an IPT system having a primary magnetic coupling structure and a secondary magnetic coupling structure, the method comprising operating the secondary magnetic coupling structure at or close to a VA limit of the secondary magnetic coupling structure in order to lower the VA requirement of the primary magnetic coupling structure.

Operating the secondary magnetic coupling structure in such a way as to lower or minimise the VA requirement of the primary magnetic coupling structure reduces leakage flux that would be produced if the primary VA requirement were to increase.

The method may include monitoring a thermal loading condition of the secondary magnetic coupling structure and operating the secondary magnetic coupling structure at or near a maximum thermal loading condition of the secondary magnetic coupling structure.

In another aspect there is provided a method for controlling an IPT system having a primary magnetic coupling structure and a secondary magnetic coupling structure, the method comprising adjusting the Q factor of the secondary magnetic coupling structure to maintain the secondary magnetic coupling structure at or near a maximum thermal loading condition of the secondary magnetic coupling structure.

In another aspect there is provided an IPT circuit controller operable to perform any one of the foregoing methods.

The invention may consist in any feature or combination of features disclosed herein.

Further aspects of the invention will become apparent from the following description.

DRAWING DESCRIPTION

Embodiments or examples will now be described with reference to the accompanying drawings, in which:

FIG. 1. shows a high level IPT system where a primary coil is driven by an AC source. The secondary has a current induced due to magnetic coupling which powers the load.

Figure 8:
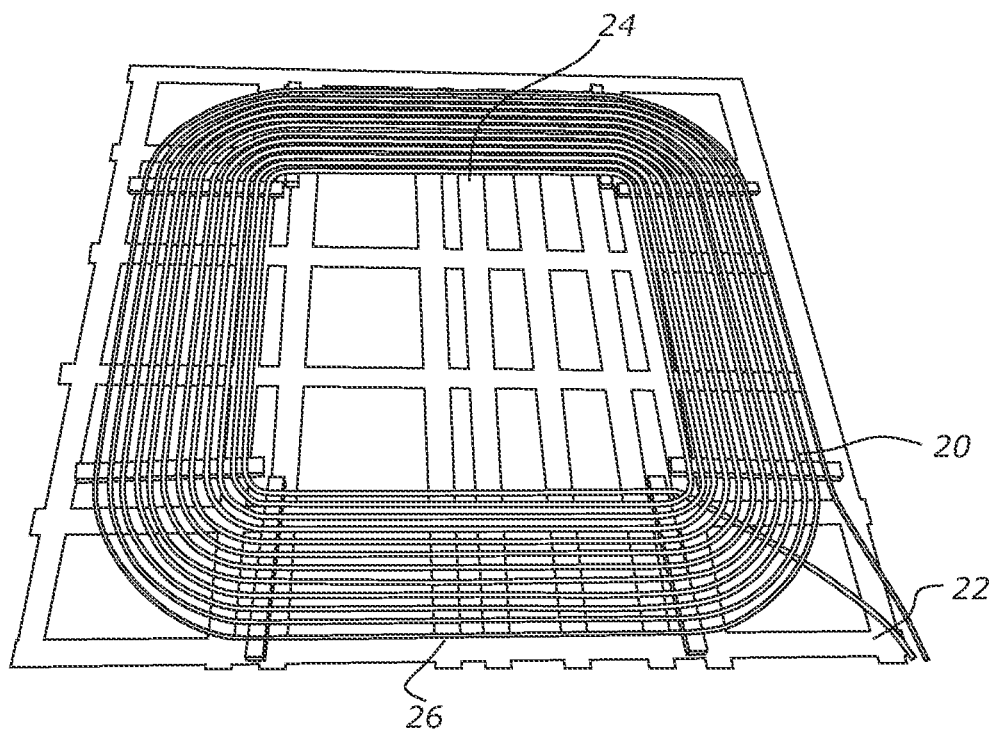
Figure 9:
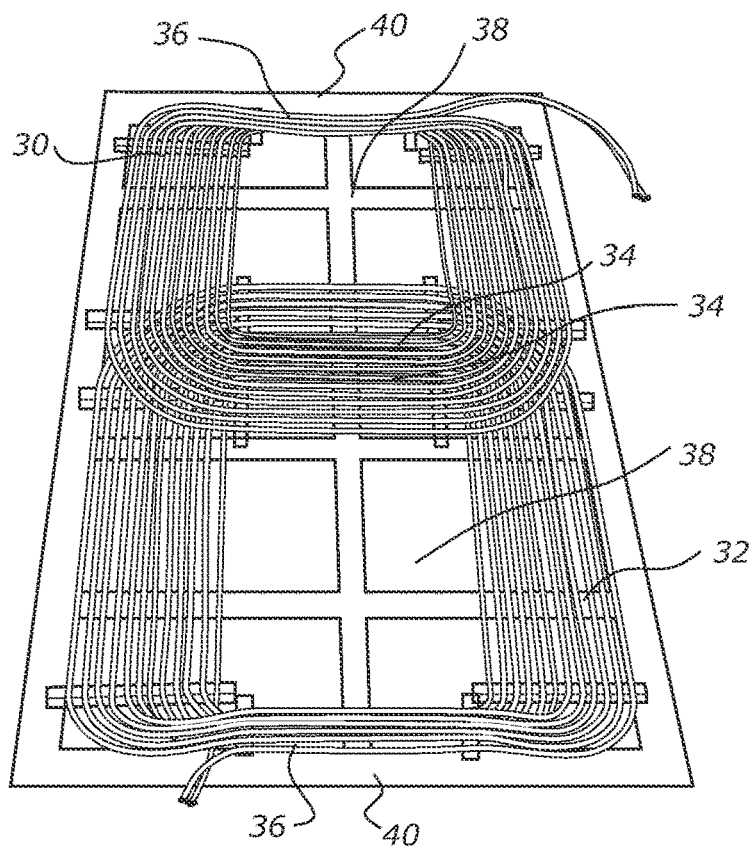
Figure 10:
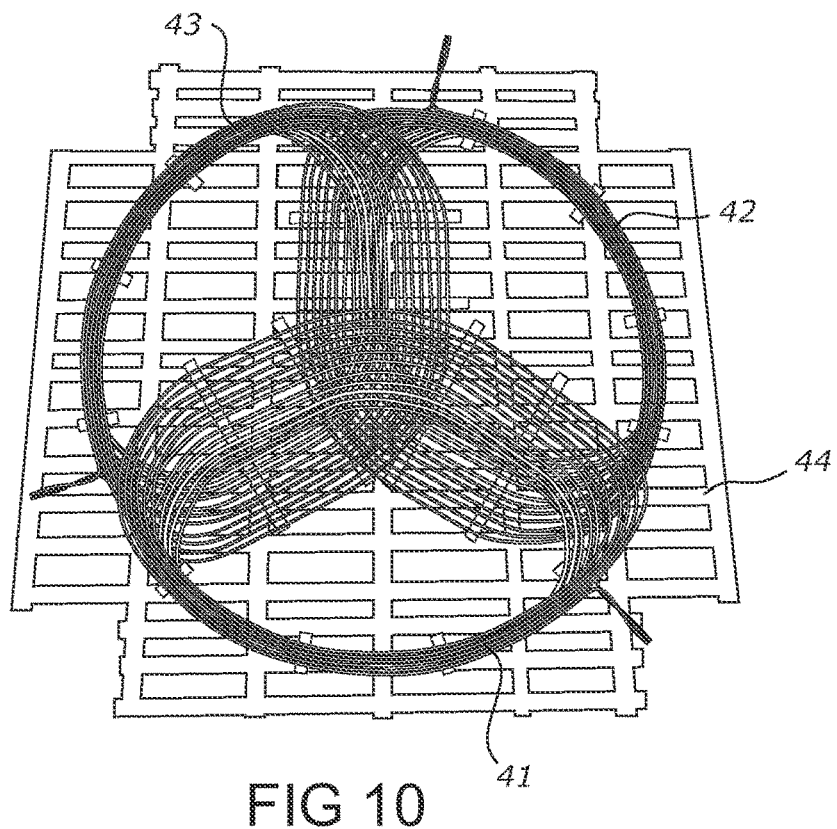
Figure 11:
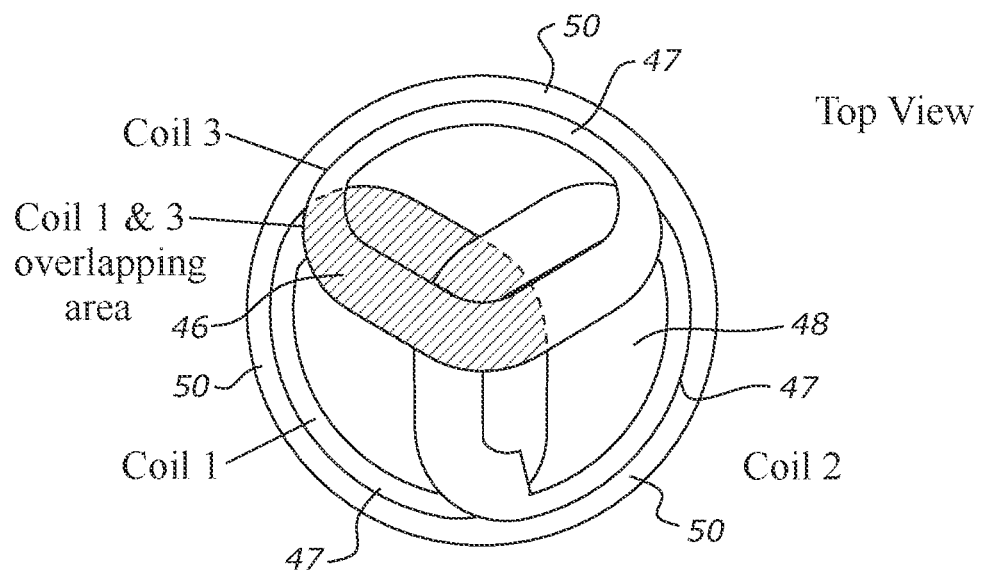
Figure 12:
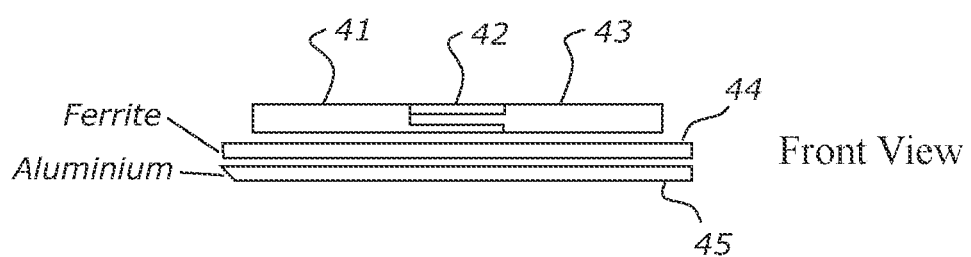
Figure 13:
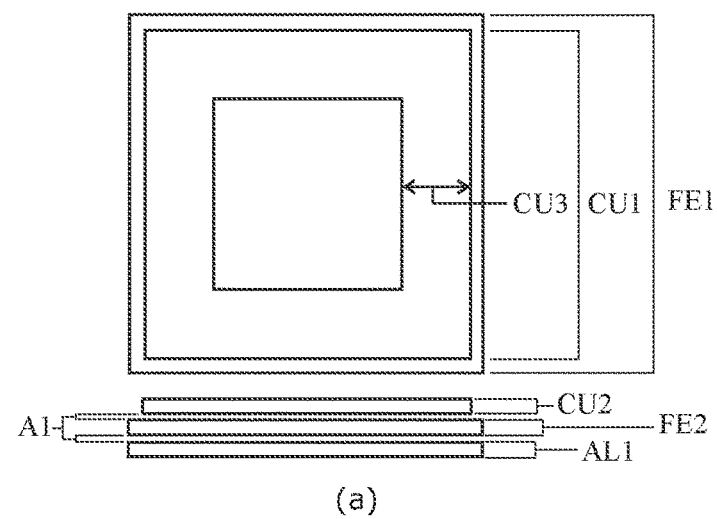
Figure 13:
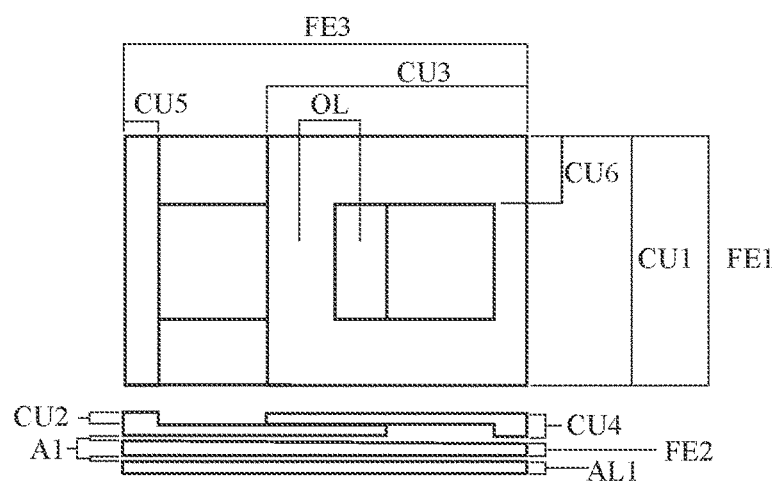
Figure 13:
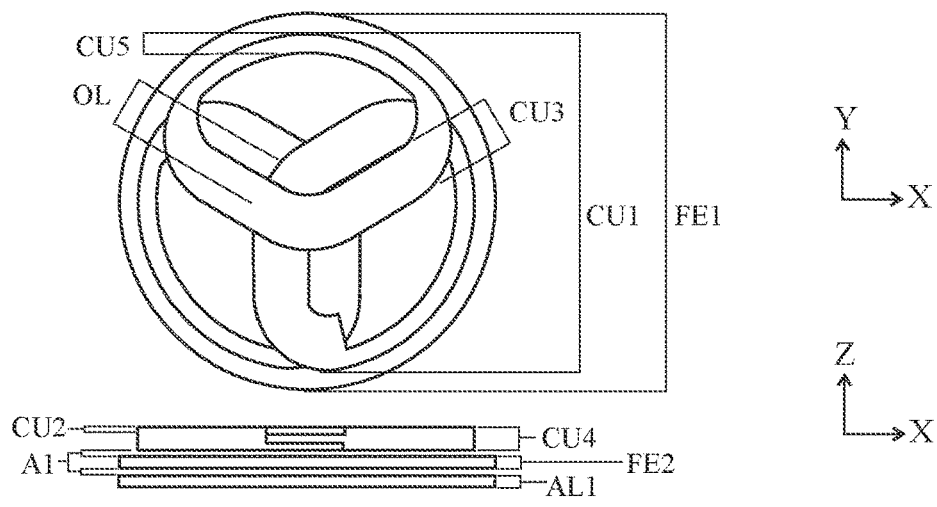
Figure 15:
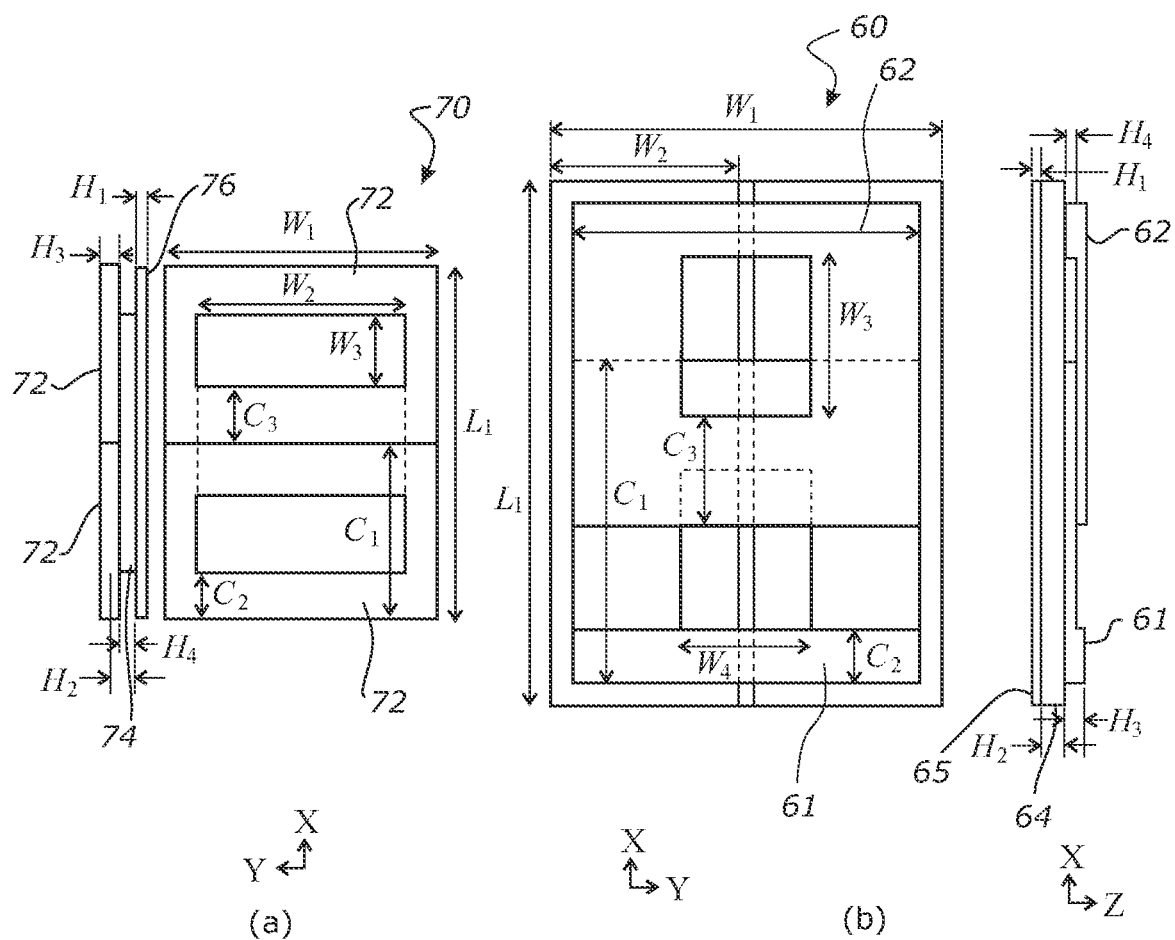
Figure 16:
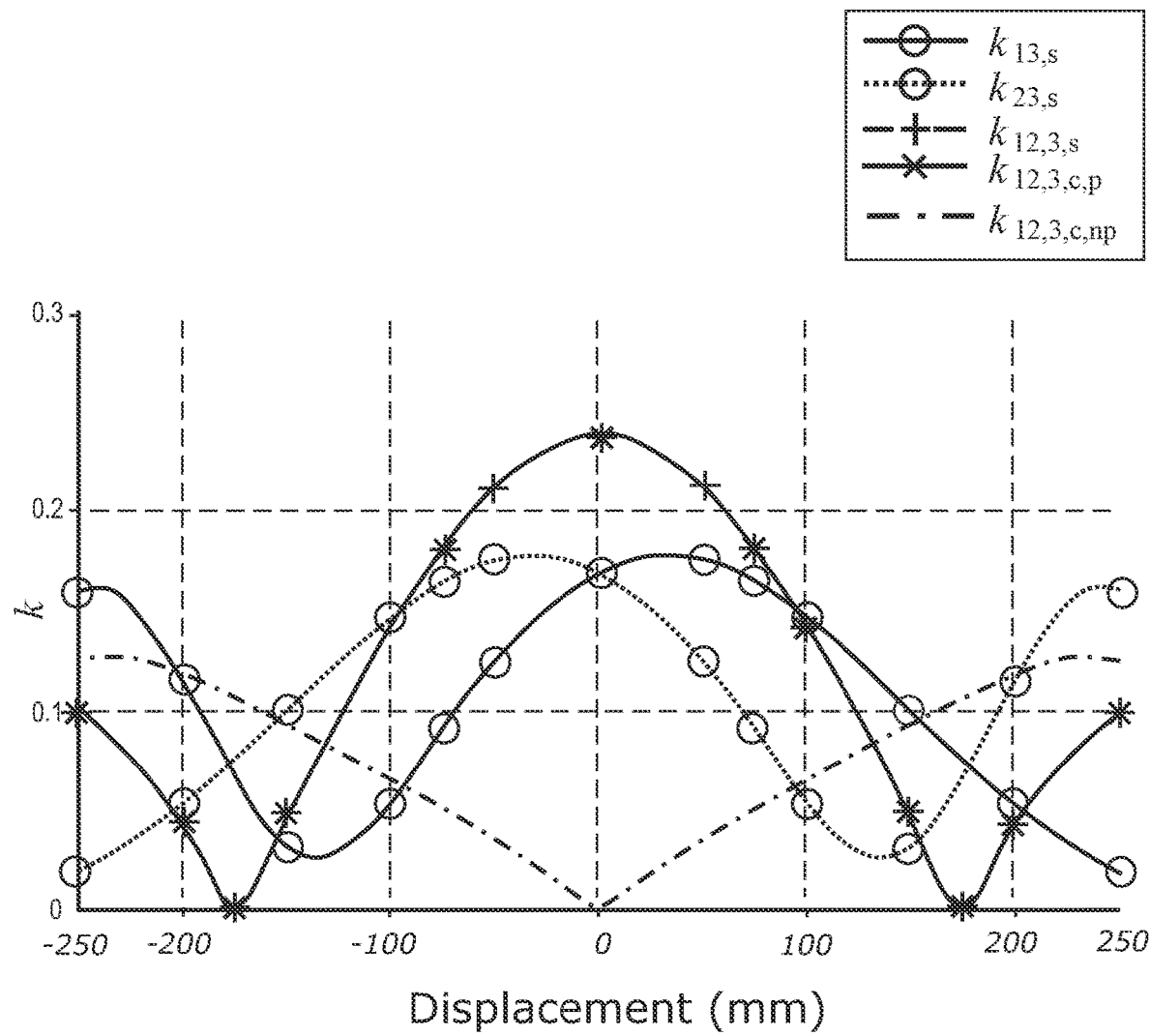

FIG. 8 is a perspective view of a CP.
FIG. 9 is a perspective view of a BPP.
FIG. 10 is a perspective view of a TPP.
FIG. 11 is a diagrammatic plan view of a TPP.
FIG. 12 is a front view of FIG. 11.
FIG. 13(a) is a diagrammatic plan and front view of a CP.
FIG. 13(b) is a diagrammatic plan and front view of a BPP.
FIG. 13(c) is a diagrammatic plan and front view of a TPP.
FIG. 14(a) is a diagrammatic front view showing a cross section taken along the x axis of an IPT system used on a vehicle on a roadway.
FIG. 14(b) is a diagrammatic front view showing a cross section taken along the y axis of an IPT system used on a vehicle on a roadway.
FIG. 15(a) is a diagrammatic front view and plan view of a DDP.
FIG. 15(b) is a diagrammatic plan view and front view of a BPP.
FIG. 16 shows profiles of simulated coupling factors of systems without additional EV and ground shielding along the X axis at Y =100 mm.

DETAILED DESCRIPTION

Figure 1:
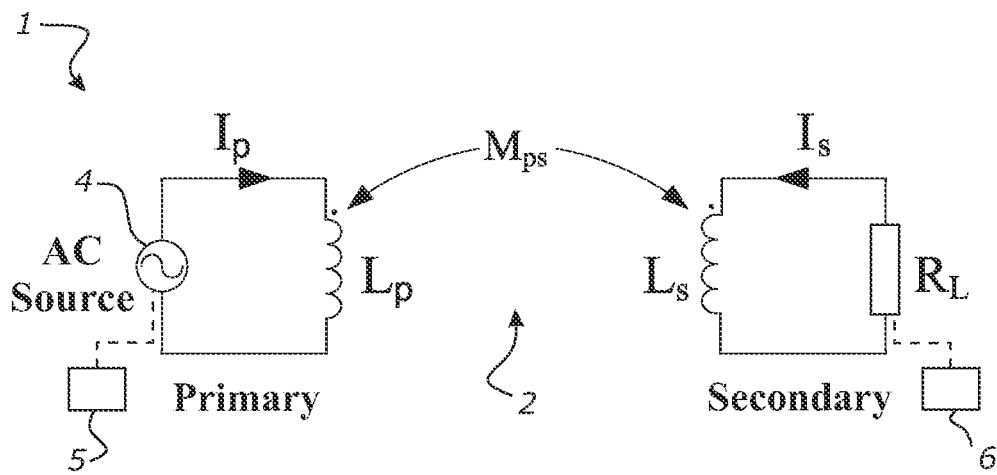

Referring to FIG. 1, an inductive power transfer (IPT) system 1 transfers power over an air gap 2 by energising a primary coil $L_p$ with an AC source 4, which generates an alternating magnetic field that is picked up by a secondary coil $L_s$.

In FIG. 1, $I_p$ and $I_s$ are the primary and secondary coil currents, $L_p$ and $L_s$ are primary and secondary coils, $M_{ps}$ is the mutual inductance between the primary coil and the secondary coil and $R_L$ is a resistor representing the load supplied by the secondary circuit. In practice, the primary has a controller 5 which controls the source and/or other aspects of the circuit in order to energise $L_p$ in the manner required for power transfer. Controller 5 is operable to perform the primary IPT circuit control methods described in this specification. Similarly, there is usually a secondary circuit controller 6 which may condition and/or control the power received by the secondary and/or the power delivered to the load. Secondary controller 6 is operable to perform the relevant secondary circuit control methods described in this specification, including monitoring a thermal condition of the secondary magnetic coupling structure.

Figure 2:
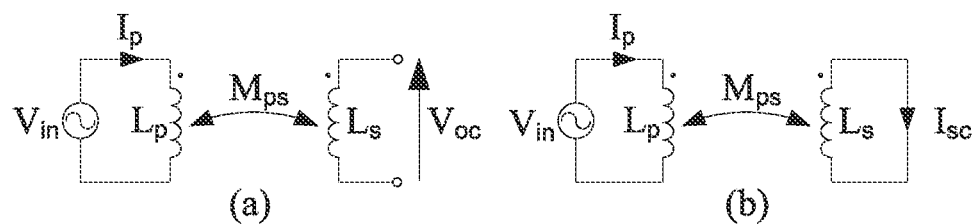
FIG. 2 shows the high level two coil IPT system of FIG. 1 depicting (a) open-circuit voltage and (b) short-circuit current induced in the secondary.

The fundamental equations for IPT systems depend on open-circuit voltage, $V_{OC}$, and short-circuit current, $I_{sc}$, shown in FIG. 2(a) and (b) respectively. $V_{in}$ and $I_p$ are the input voltage and current to the primary inductor, $L_p$. $I_p$ induces either $V_{OC}$ in FIG. 2(a) or $I_{sc}$ in FIG. 2(a), which can be expressed as:

$$V_{oc} = j\omega M_{ps} I_p \tag{1}$$

$$I_{sc} = \frac{M_{ps}}{L_s} I_p \tag{2}$$

From (1) and (2), the uncompensated power output, $S_u$ can be found:

$$S_u = V_{oc} I_{sc} = \omega \frac{M_{ps}^2}{L_s} I_p^2 \tag{3}$$

The p and s subscripts denote the primary and secondary respectively, and w is the operating angular frequency. $M_{ps}$ refers to the mutual coupling between the primary coil, $L_p$, and the secondary coil, $L_s$. One of the factors directly affecting the power transfer capability of the IPT system is the magnetic structure of the coils $L_p$ and $L_s$ which determines the magnetic coupling between the primary circuit and the secondary circuit. The mutual coupling between the primary and the secondary indicates how much of the magnetic field generated by the primary is picked up by the secondary. Many different types of magnetic structures have been proposed to increase the mutual coupling between the primary and the secondary by changing the number or the shape of the coils.

The coupling factor between the primary coil and the secondary coil can be expressed as:

$$k_{PS} = \frac{M_{PS}}{\sqrt{L_P L_S}}$$

Figure 3:
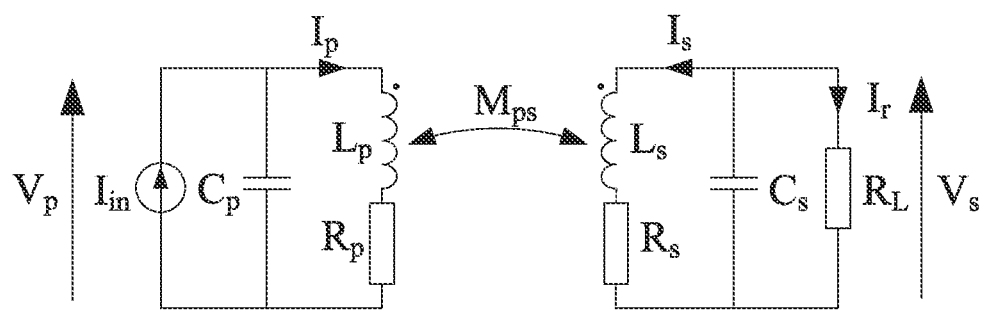
FIG. 3 shows a typical two coil IPT system including magnetic losses with parallel tuned primary and secondary.

A typical two coil IPT system with parallel tuned primary and secondary is shown in FIG. 3. The circuit includes magnetic losses in the primary and secondary inductors as $R_p$ and $R_s$. Assuming steady-state conditions with no saturation in any magnetically permeable material (such as ferrite), associated with each magnetic structure, the following equations can be found for the two coil IPT system shown in FIG. 3 by applying Kirchoff's Voltage Law:

$$V_p = (j\omega L_p + R_p)I_p + j\omega M_{ps}I_s \quad (4)$$

$$0 = j\omega M_{ps}I_p + \left(j\omega L_s + R_s + \frac{1}{j\omega C_s + \frac{1}{R_L}}\right)I_s \quad (5)$$

Assuming tuning is ideal and the operating frequency stays constant, the value of the primary and secondary tuning capacitors, $C_p$ and $C_s$, is determined by $w=1/\sqrt{LC}$.

The Q factor of the parallel tuned secondary circuit can be expressed as $Q_s = R_L/wL_s$ From (4) and (5), the operations of the circuit can be shown in a matrix form:

$$\begin{bmatrix} V_p \\ 0 \end{bmatrix} = \begin{bmatrix} j\omega L_p + R_p & j\omega M_{ps} \\ j\omega M_{ps} & j\omega L_s + R_s + \frac{1}{j\omega C_s + \frac{1}{R_L}} \end{bmatrix} \begin{bmatrix} I_p \\ I_s \end{bmatrix} \quad (6)$$

From (6), some useful equations for voltages, currents and VA across the primary and secondary coils, power output and the magnetic efficiency can be derived as shown:

$$V_p = \left(j\omega L_p + R_p + \frac{\omega^2 M_{ps}^2}{j\omega L_s + R_s + \frac{1}{j\omega C_s + \frac{1}{R_L}}}\right)I_p \quad (7)$$

$$V_s = \frac{1}{j\omega C_s + \frac{1}{R_L}}I_s \quad (8)$$

$$I_s = \frac{-j\omega M_{ps}}{j\omega L_s + R_s + \frac{1}{j\omega C_s + \frac{1}{R_L}}}I_p \quad (9)$$

$$I_r = \frac{I_s}{\sqrt{Q_s^2 + 1}} \quad (10)$$

$$VA_p = |V_p I_p| \quad (11)$$

$$VA_s = |V_s I_s| \quad (12)$$

$$P_{out} = V_s I_r \quad (13)$$

$$\eta_{mag} = \frac{V_s I_r}{\mathbb{R}(VA_p)} = \frac{P_{out}}{P_{in}} \quad (14)$$

$V_p$ is the voltage across the primary inductor including considerations for magnetic losses in the primary and the reflected impedances from the secondary. $I_p$ is the driving current in the primary inductor. The $VA_p$ and $VA_s$ are the VA in primary and secondary coils respectively and $I_r$ is the current to the load, $R_L$. The equations shown in (7)-(14) can easily be modified for a series tuned system. However, for purposes of conciseness and clarity only parallel tuned systems are discussed in these examples.

Figure 4:
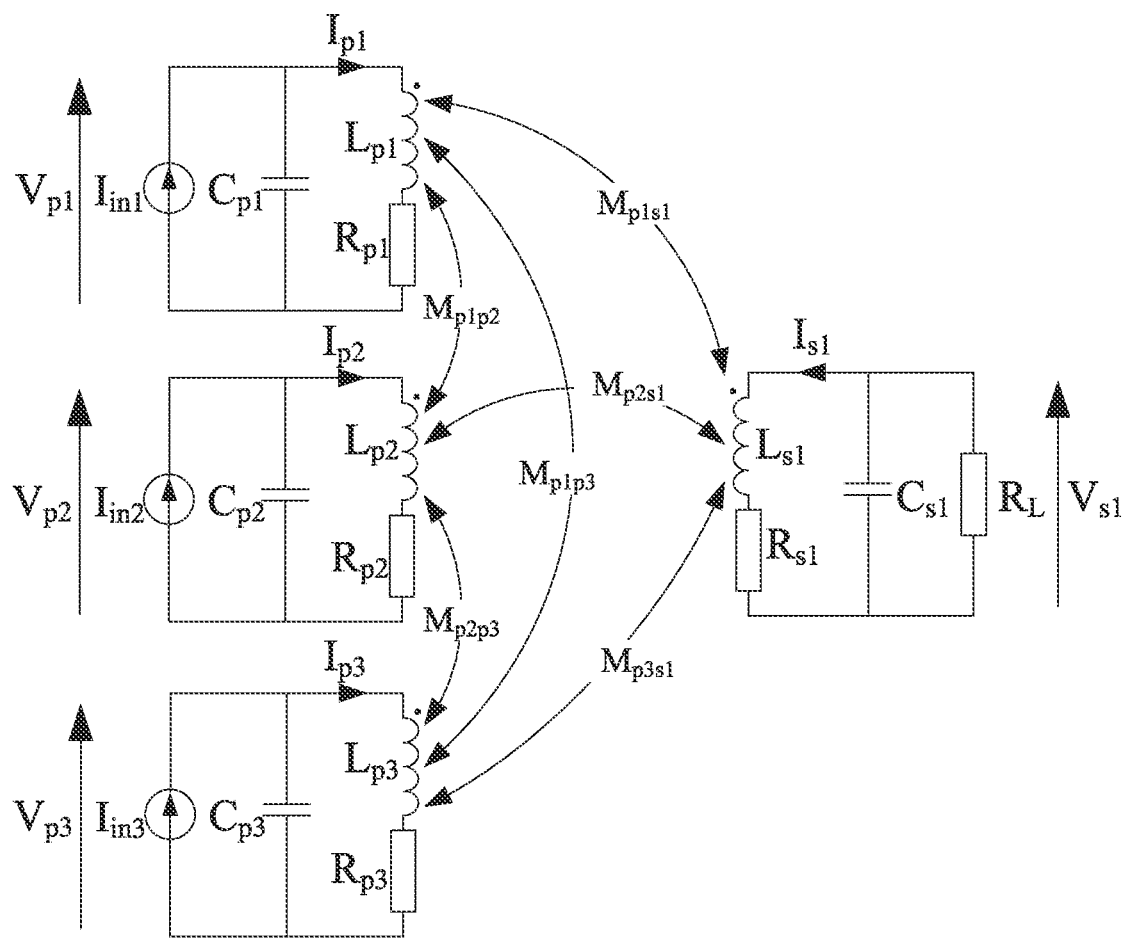
FIG. 4 shows a four coil IPT system with three coil parallel tuned primary and a single coil parallel tuned secondary including magnetic losses in the coils.

The same mathematical manipulations can be undertaken for an IPT system with two, three or more primary coils. As an example, a system with three primary coils and a secondary coil, as shown in FIG. 4, will be considered. The system will be expressed in a matrix form. From the matrix, useful equations describing the system are found for voltages, currents and VA of the primary and secondary coils.

$$\begin{bmatrix} V_1 \\ V_2 \\ V_3 \\ 0 \end{bmatrix} = \begin{bmatrix} j\omega L_{p1} + R_{p1} & j\omega M_{p1p2} & j\omega M_{p1p3} & j\omega M_{p1s1} \\ j\omega M_{p1p2} & j\omega L_{p2} + R_{p2} & j\omega M_{p2p3} & j\omega M_{p2s1} \\ j\omega M_{p1p3} & j\omega M_{p2p3} & j\omega L_{p3} + R_{p3} & j\omega M_{p3s1} \\ j\omega M_{p1s1} & j\omega M_{p2s1} & j\omega M_{p3s1} & j\omega L_{s1} + R_{s1} + \frac{1}{j\omega C_{s1} + \frac{1}{R_L}} \end{bmatrix} \begin{bmatrix} I_{p1} \\ I_{p2} \\ I_{p3} \\ I_{s1} \end{bmatrix} \quad (15)$$

$$V_{p1} = \left(j\omega L_{p1} + R_{p1} + \frac{\omega^2 M_{p1s1}^2}{j\omega L_{s1} + R_{s1} + \frac{1}{j\omega C_{s1} + \frac{1}{R_L}}}\right)I_{p1} + \quad (16)$$

$$\left(j\omega M_{p1p2} + \frac{\omega^2 M_{p1s1} M_{p2s1}}{j\omega L_{s1} + R_{s1} + \frac{1}{j\omega C_{s1} + \frac{1}{R_L}}}\right)I_{p2} +$$

$$\left(j\omega M_{p1p3} + \frac{\omega^2 M_{p1s1} M_{p3s1}}{j\omega L_{s1} + R_{s1} + \frac{1}{j\omega C_{s1} + \frac{1}{R_L}}}\right)I_{p3}$$

-continued $$V_{p2} = \left(j\omega M_{p1p2} + \frac{\omega^2 M_{p1s1} M_{p2s1}}{j\omega L_{s1} + R_{s1} + \frac{1}{j\omega C_{s1} + \frac{1}{R_L}}}\right) I_{p1} + \tag{17}$$

$$\left(j\omega L_{p2} + R_{p2} + \frac{\omega^2 M_{p2s1}^2}{j\omega L_{s1} + R_{s1} + \frac{1}{j\omega C_{s1} + \frac{1}{R_L}}}\right) I_{p2} +$$

$$\left(j\omega M_{p2p3} + \frac{\omega^2 M_{p2s1} M_{p3s1}}{j\omega L_{s1} + R_{s1} + \frac{1}{j\omega C_s 1 + \frac{1}{R_L}}}\right) I_{p3}$$

$$V_{p3} = \left(j\omega M_{p1p3} + \frac{\omega^2 M_{p1s1} M_{p3s1}}{j\omega L_{s1} + R_{s1} + \frac{1}{j\omega C_{s1} + \frac{1}{R_L}}}\right) I_{p1} + \tag{18}$$

$$\left(j\omega M_{p1p3} + \frac{\omega^2 M_{p2s1} M_{p3s1}}{j\omega L_{s1} + R_{s1} + \frac{1}{j\omega C_{s1} + \frac{1}{R_L}}}\right) I_{p2} +$$

$$\left(j\omega L_{p3} + R_{p3} + \frac{\omega^2 M_{p3s1}^2}{j\omega L_{s1} + R_{s1} + \frac{1}{j\omega C_{s1} + \frac{1}{R_L}}}\right) I_{p3}$$

$$V_{s1} = \frac{1}{j\omega C_{s1} + \frac{1}{R_L}} I_{s1} \tag{19}$$

$$I_{s1} = \frac{(j\omega M_{p1s1} + j\omega M_{p2s1} I_{p2} + j\omega M_{p3s1} I_{p3}}{j\omega L_{s1} + R_{s1} + \frac{1}{j\omega C_{s1} + \frac{1}{R_L}}} \tag{20}$$

$$VA_p = VA_{p1} + VA_{p2} + VA_{p3} = |V_{p1} I_{p1}| + |V_{p2} I_{p2}| + |V_{p3} I_{p3}| \tag{21}$$

Subscript numbers are attached to p and s to differentiate the multiple coils present in the primary and secondary. The $VA_s$ and $\eta_{mag}$ for this three coil primary to single coil secondary IPT system shown in FIG. 4 are found using the same equations used for the two coil system shown in (10) and (12)-(14). Assuming no changes to the air gap or alignment between the primary and the secondary pads, the current through the secondary coil, $I_{s1}$, is a function of three primary currents, $I_{p1}$, $I_{p2}$ and $I_{p3}$, weighted by the mutual coupling between each of the primary coils to the secondary coil. The current through the secondary coil, $I_{s1}$, can be viewed as the sum of the contributions from each primary pads using superposition.

The equations in (16)-(18) are such that each of $V_{p1}$, $V_{p2}$ or $V_{p3}$ and subsequently $I_{p1}$, $I_{p2}$ or $I_{p3}$ are co-dependent on each other. If any changes were made to one of the driving currents, this would change the magnitude and phase of the other two driving currents. One driving current cannot be set to a certain magnitude or phase without considering the magnitude and phase of the other driving currents. The mutual coupling between the three primary coils ($M_{p1p2}$, $M_{p1p3}$ and $M_{p2p3}$) changes the degree of impact each driving current has on the other. Any increase in the mutual coupling between the three primary coils increases the $VA_p$ shown in (21), which would require the power supply electronic components to drive the primary coils harder. The equations (16)-(21) account for any phase differences between $I_{p1}$, $I_{p2}$ and $I_{p3}$. From (16)-(18), any changes in the mutual coupling between the three primary coils given by $M_{p1p2}$, $M_{p1p3}$ and $M_{p2p3}$ would be found to have no impact on the magnetic efficiency of the system shown in (14) since only active power is considered for magnetic efficiency.

For any mutually decoupled secondary pads with any number of coils, such as CP with a single coil or BPP with two mutually decoupled coils, each secondary coil can be considered to be independent. The equations (16)-(21) can be applied to any mutually decoupled secondary pads, such as the BPP investigated in this paper, by considering one secondary coil at a time in the system. One way of measuring the magnetic coupling for IPT systems with multiple coils is to measure the effective coupling factor, $k_{eff}$, which is a measure of magnetic coupling between the primary and the secondary with multiple coils. For systems with multiple coils, such as BPP or TPP, the $k_{eff}$ is useful since only one number needs to be considered instead of all the coupling factors between the coils in the system. To find the effective coupling factor for systems with multiple primary and the secondary coils, the contributions of the coils in the system to $S_u$ and $VA_p$ are summed for all the coils then inserted into (23). $k_{eff}$ is derived from (1)-(3) and does not take into account the losses in the coils. For example, $k_{eff}$ of a system with three primary coils and a single secondary coil shown in FIG. 4, where $k_{ps}=M_{ps}/\sqrt{(L_p L_s)}$, is expressed as:

$$S_{u_{ps}} = |V_{oc_{ps}} I_{sc_{ps}}| = \omega \frac{M_{ps}^2}{L_s} I_p^2 = \omega L_p I_p^2 k_{ps}^2 = VA_p k_{ps}^2 \quad (22)$$

$$k_{ps} = \sqrt{\frac{S_{u_{ps}}}{VA_p}} \quad (23)$$

$$k_{eff} = \sqrt{\frac{\sum_{s=1}^{S} \sum_{p=1}^{P} S_{u_{ps}}}{\sum_{p=1}^{P} VA_p}} = \sqrt{\frac{S_{u11} + S_{u21} + S_{u31}}{VA_1 + VA_2 + VA_3}} \quad (24)$$

In the expression above, P and S represent the number of primary and secondary coils respectively, where P=3 and S=1 in this example. The $VA_{p1}$, $VA_{p2}$ and $VA_{p3}$ are the VA of the primary coils 1, 2 and 3. $S_{u11}$, $S_{u21}$ and $S_{u31}$ are the uncompensated power in the secondary coil due to each of the primary coils. Generally, IPT systems require a certain level of $S_u$ to be transferred to the secondary to power the load so IPT systems with magnetic structures that can achieve higher $k_{eff}$ would be able to transfer the required $S_u$ for less $VA_p$.

As discussed above, the mutual coupling between the coils in the same pad, such as $M_{p1p2}$, $M_{p1p3}$ and $M_{p2p3}$ in the three coil primary pad impact the magnitude and the phase of voltages and subsequently impact the currents in the other coils. If these mutual couplings between the primary coils are made to be negligible in BPP and TPP by adjusting the partial overlap between the coils (as described further below), then (16) - (18) can be reduced to:

$$V_{p1} = \left( j\omega L_{p1} + R_{p1} + \frac{\omega^2 M_{p1s1}^2}{j\omega L_{s1} + R_{s1} + \frac{1}{j\omega C_{s1} + \frac{1}{R_L}}} \right) I_{p1} + \quad (25)$$

$$\frac{\omega^2 M_{p1s1} M_{p2s1}}{j\omega L_{s1} + R_{s1} + \frac{1}{j\omega C_{s1} + \frac{1}{R_L}}} I_{p2} + \frac{\omega^2 M_{p1s1} M_{p3s1}}{j\omega L_{s1} + R_{s1} + \frac{1}{j\omega C_{s1} + \frac{1}{R_L}}} I_{p3}$$

$$V_{p2} = \frac{\omega^2 M_{p1s1} M_{p2s1}}{j L_{s1} + R_{s1} + \frac{1}{j\omega C_{s1} + \frac{1}{R_L}}} I_{p1} + \quad (26)$$

$$\left( j\omega L_{p2} + R_{p2} + \frac{\omega^2 M_{p2s1}^2}{j\omega L_{s1} + R_{s1} + \frac{1}{j\omega C_{s1} + \frac{1}{R_L}}} \right) I_{p2} +$$

$$\frac{\omega^2 M_{p2s1} M_{p3s1}}{j\omega L_{s1} + R_{s1} + \frac{1}{j\omega C_{s1} + \frac{1}{R_L}}} I_{p3}$$

$$V_{p3} = \frac{\omega^2 M_{p1s1} M_{p3s1}}{j\omega L_{s1} + R_{s1} + \frac{1}{j\omega C_{s1} + \frac{1}{R_L}}} I_{p1} + \quad (27)$$

$$\frac{\omega^2 M_{p2s1} M_{p3s1}}{j\omega L_{s1} + R_{s1} + \frac{1}{j\omega C_{s1} + \frac{1}{R_L}}} I_{p2} +$$

$$\left( j\omega L_{p3} + R_{p3} + \frac{\omega^2 M_{p3s1}^2}{j\omega L_{s1} + R_{s1} + \frac{1}{j\omega C_{s1} + \frac{1}{R_L}}} \right) I_{p3}$$

Equations (25)-(27) are expressed as functions of the driving currents, impedances of the primary circuits and reflected impedances. The dependency of the magnitude and the phases of the primary coil voltages on the other driving currents is reduced by eliminating the mutual couplings from the equations. Similarly to what has been shown in (16)-(18), the VA required to drive the primary coils is reduced when the mutual couplings between the primary coils is decreased. (25)-(27) show that while it is possible for the TPP primary coils to be ideally mutually decoupled when the TPP is on its own, when the secondary pad is introduced into the system, some mutual coupling between the primary coils appear due to the reflected impedances. If it can be ensured that the impact between the driving currents of the primary coils are small enough even with the reflected impedances, the primary coils can be driven by currents with any magnitude or phase without impacting other driving currents in adjacent coils in the TPP. As long as the air gaps are ensured to be large enough, the impact of secondary pad to the mutual decoupling of the TPP primary stays relatively small.

Figure 5:
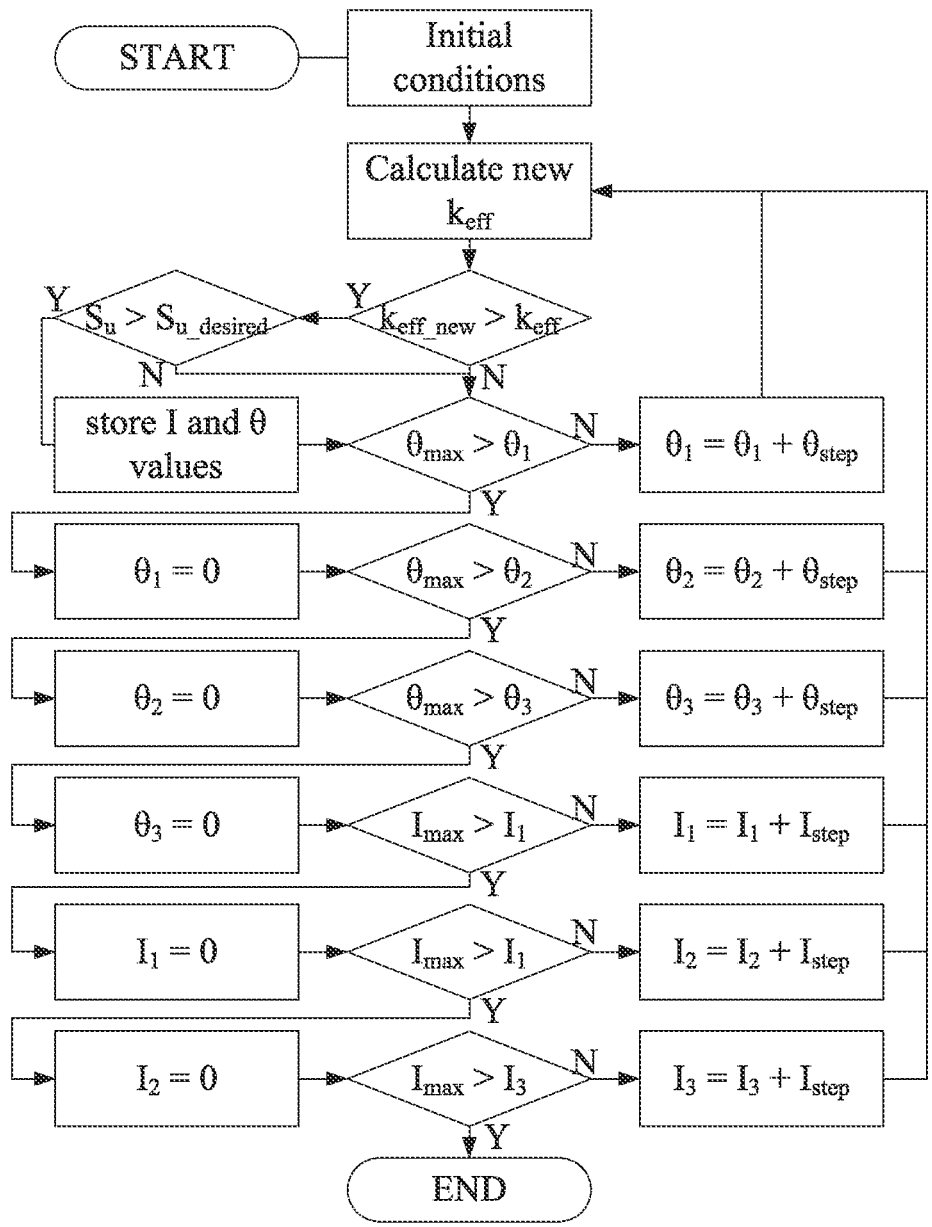
FIG. 5 is a flowchart showing the optimisation process for driving currents to obtain the highest possible effective coupling factor for an IPT system with three mutually decoupled primary coils.

Given that the driving currents in each of the primary coils can be adjusted independently for the TPP primary, the shape of the generated magnetic field from the TPP primary can be changed by controlling the magnitudes and phases of the driving currents to each of the coils. A controller can be used control the driving currents in the TPP to shape the generated magnetic field to find the optimal magnetic field shape which results in the highest $k_{eff}$. An example flowchart for a method of optimising the driving currents for a structure having three mutually decoupled primary coils, such as the TPP, is shown in FIG. 5. The current control flowchart presented in FIG. 5 assumes that the inductance in the coils and the coupling factors between all the coils in the system are known and the driving currents are independent of each other. The controller sweeps through all the possible combinations of the magnitudes and phase of the three driving currents and stores the combinations with the highest $k_{eff}$ that meets the $S_u$ requirement of the secondary. Thus the controller begins with a first phase angle and current for the first coil, increments one or both of phase angle and current, detects the power transferred and calculates whether the change results in an improved $k_{eff}$. The steps are repeated for each coil until the greatest $k_{eff}$ is achieved. From the combinations of magnitude and phases of the driving currents found by the controller, the combination of phase and current that requires the lowest $VA_p$ is chosen to drive the primary coils, which is the driving currents that result in the highest $k_{eff}$. The initial conditions in FIG. 5 include setting the minimum and maximum magnitudes and phases of the driving currents according to the ratings of the components, such as the maximum ratings of the Litz wire comprising the coils, and setting the incremental step size of the magnitude and phase, $I_{step}$ and $\theta_{step}$, to adjust the complexity of the computation. It will be seen that the general method is applicable not just to systems with three primary coils, but also to systems with two or more primary coils.

If the system changes any air gap, misalignment or type of the secondary, the controller would have to re-calculate the optimal magnitudes and phases of the driving currents using the same process. In order for the controller to function properly, the air gaps and misalignments needs to be bound by the system to ensure that the primary coils can always transfer the required Su to the secondary even in the worst case where the three primary coils are driven at the maximum rated currents.

Figure 6:
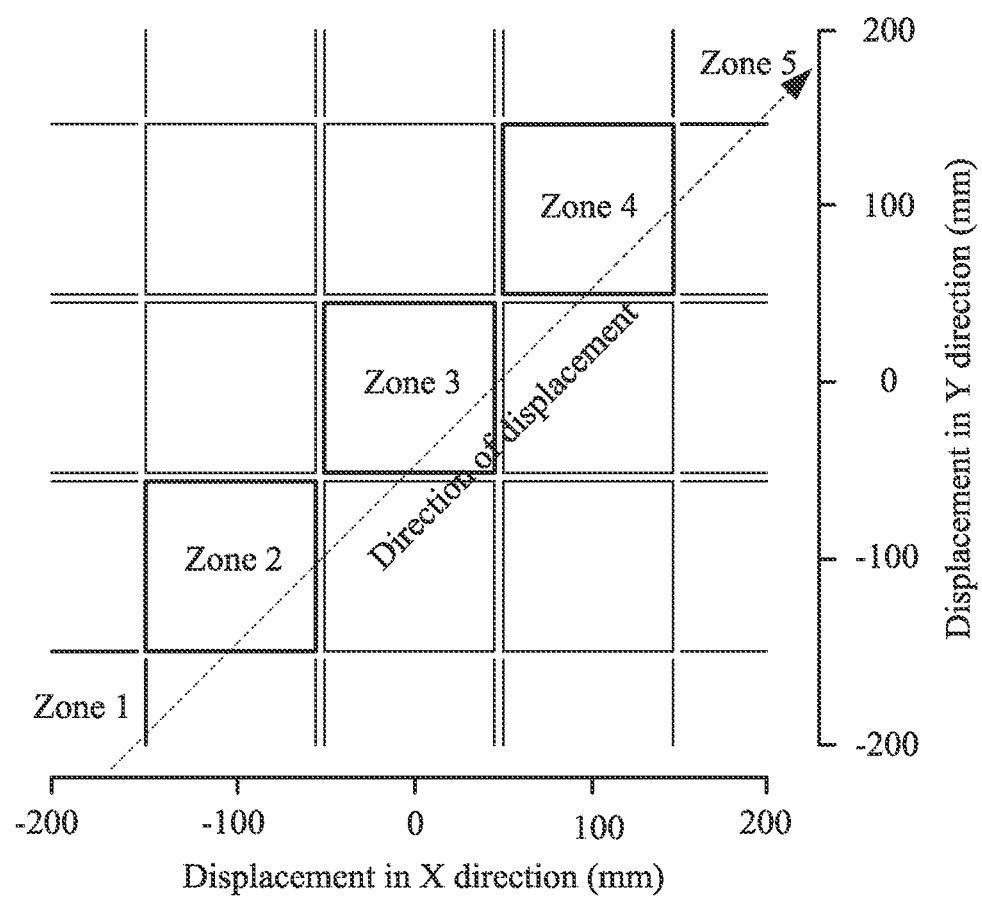
FIG. 6 is a diagram showing secondary pad displacement placed within discretised zones. Each zone has a pre-set magnitude and phase of the driving currents stored in the controller for the highest effective coupling factor.

For practical purposes, the computation and control actions by the controller would be minimised if the displacement of the secondary were discretised into multiple displacement 'zones' as shown in FIG. 6 instead of constantly re-calculating the optimal magnitudes and phases since the coupling factors between the coils constantly change when the secondary is being displaced.

For example, the secondary pad being displaced in both X and Y direction is shown in FIG. 6 and the zones 1 to 5 which the secondary pad passes through are highlighted. If the air gap and the type of the primary and the secondary pads are known, it is possible to have optimal magnitude and phases pre-calculated and stored in the controller for all the possible displacement zones so the controller would only have to look up the optimal driving currents. While there are only 25 displacement zones in total investigated as presented in FIG. 6, the displacement zones can be made smaller if required for a finer control of the driving currents.

Although the BPP and TPP structures referred to above are designed to have minimal mutual coupling between coils, there may be some coupling that occurs, for example due to the presence of a secondary, or other, magnetic structure.

Without intentionally designing the primary coils to be mutually decoupled, a degree of mutual coupling may tend to exist when more than one primary coil is used. Adjacent primary coils pick up energy due to the mutual coupling between the primary coils when one of the primary coils is energised. Generally the energy picked up from other primary coils work against the current in the primary coil so the power supplies have to work harder to maintain the same level of energisation in the coils. The control of the energisation of the primary coils also becomes difficult when the energisation is not dependent only on the primary coil itself, but also dependent on the energy picked up from other primary coils as well. By mutually decoupling the primary coils by using magnetic structures such as the BPP and TPP structures described herein, the energisation of the primary coils becomes independent of other primary coils so that each primary coil can be energised with a current of different magnitude and phase.

As long as the mutual decoupling between the primary coils is ensured, the primary coils can generate magnetic fields that can be optimally picked up by the secondary regardless of the displacements or air gaps by manipulating the magnitudes and phases of the currents in the primary coils.

In practice, ideal mutual decoupling between the primary coils is impossible to achieve since the introduction or displacement of the secondary in an IPT system influences the path of the magnetic field generated by the primary, which in turn changes the mutual coupling between the primary coils. Other factors such as component degradation over time or imperfections in manufacturing would also contribute to the change in mutual coupling between the primary coils. The changes to mutual coupling in the primary coils due to the aforementioned factors are generally small enough that the energisation of the primary two or more coils can still be assumed to be controlled independently. However, an increase in mutual coupling between the primary coils results in energy picked up from other primary coils which influences the magnitude and phase of the energisation current.

Depending on the direction of the induced current from the energised primary coil, the energy picked up can either reinforce or weaken the magnetic field generated by the primary coils to impact the power transfer.

Figure 7:
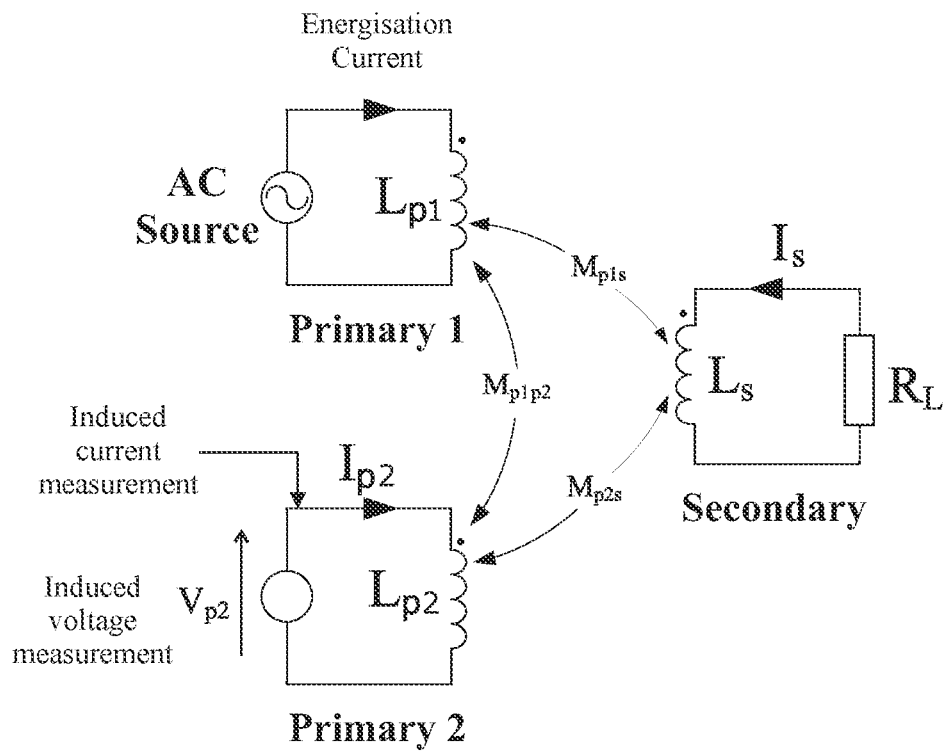
FIG. 7 shows circuit diagrams showing a high level IPT system where a primary coil is driven by an AC source. The secondary has a current induced due to magnetic coupling which powers the load.

The energisation in the primary coils can be increased or reduced to compensate for the changes in mutual coupling in the primary coils to maintain a constant power transfer to the load. In order to compensate for the mutual coupling changes in the primary coils, the changes in mutual coupling need to be quantified. A method for measuring the mutual coupling between the primary coils is to energise the primary coils one by one then measure the voltage and current induced in the other primary coils. An example of one primary coil being energised to measure the voltage and current across another primary coil is shown in FIG. 7. In FIG. 7, the primary coil 1 and 2 are given by $L_{p1}$, and $L_{p2}$ and the two primary coils have a mutual inductance of $M_{p1p2}$. When the mutual inductance is not zero, a voltage and current is induced by $L_{p1}$, to $L_{p2}$ given by $V_{p2}$ and $I_{p2}$ respectively. Although a two coil structure (i.e. BPP) is used in this example, it is clear that the compensation method can be used for TPP structures, or structures having more than three mutually decoupled coils.

The additional reflected impedance of the circuit for primary 2 can be found by using the induced voltage and current. The reflected impedances then can be used to quantify the mutual coupling between the primary coils. Using this method, the exact mutual coupling between the primary coils can be found regardless of the displacement of the secondary so the energisation in each of the coils can be adjusted to maintain a constant, or required, power transfer.

Examples of new magnetic structures are now described with reference to FIGS. 8-13. These structures may be used in the systems described throughout this specification.

FIG. 8 shows an example of a practical embodiment of a CP magnetic structure. FIG. 13(a) shows a diagrammatic plan view and side elevation of the FIG. 8 structure, and corresponding reference numerals are used. The structure of FIGS. 8 and 13(a) has a coil 20 arranged in a layer over a layer of magnetically permeable material 22. In this example the coil 20 is flat and wound as a spiral. The individual turns of the coil may be provided immediately adjacent to each other or on top of each other, but in this example the turns are spread slightly so that adjacent individual turns are separated or spaced slightly apart from each other. It has been found that a spread arrangement such as that shown in FIG. 8 is advantageous since the separation distance can be selected so that no significant flux escapes from the slightly separated turns, and as such there is a greater overall separation between the interior and exterior perimeters 24 and 26 of the coil. Thus the field produced by the coil when energised traverses a greater distance in the permeable material 22 beneath the coil and hence also extends in a greater arch beyond the structure on the side opposite to the permeable material 22. The result is that the distance over which effective magnetic coupling can occur is extended, so power may be transferred wirelessly over a greater separation distance between the magnetic coupling structures. We have found that the separation distance between adjacent turns may be up to 1 diameter of the coil conductor, or 1.5 times the coil conductor diameter, or between 1 and 2 times the coil conductor diameter.

The permeable material 22 may comprise ferrite. A number of different physical arrangements for the permeable layer 22 are possible. In one example the material can be provided as a sheet. In another arrangement the layer is formed from discrete pieces of permeable material, and may be discontinuous, for example being provided in elongate strips that extend in a direction from the interior perimeter 24 to the exterior perimeter 26. A magnetic shield 28 may be provided on the side of permeable layer 22 that is opposite the coil 20. In one example the shield 28 is constructed from Aluminium.

FIG. 9 shows an example of a practical embodiment of a BPP magnetic structure. FIG. 13(b) shows a diagrammatic plan view and side elevation of the FIG. 9 structure, and corresponding reference numerals are used. The structure of FIGS. 9 and 13(b) has two coils 30 arranged in a layer over a layer of magnetically permeable material 32. Again, a magnetic shield 33 may be provided. In this example the coils 30 are both flat and each is wound as a spiral. As described above, the coils are essentially decoupled i.e. they have minimal mutual coupling. This is achieved by overlapping the coils as will be described further below with reference to a TPP structure.

There is a portion 34 of each coil that overlaps the other. The amount of overlap is arranged to effect decoupling between the coils. The overlap portion 34 of each coil has adjacent turns of each coil spread or separated from each other as described in relation to the FIGS. 8 and 13(a) example above. A part 36 of the remaining non-overlapped portion of each coil has adjacent turns clumped tightly together so as to be immediately adjacent to each other, or on top of each other. Parts 36 are located at the ends of the BPP structure. The effect of having the turns in overlap portions 34 spread provides a high arching flux or field from the centre 38 of each coil to the permeable material on the other side of the pad structure i.e. to the side at which the centre 38 of the other coil is located. Conversely, the clumped turns 36 at each end create a low arching flux which returns to the permeable material through the small marginal end strip 40. The flux at the end of the structure is thus constrained which minimises leakage flux. The result is that the predominant flux path formed by energisation of a winding is a high arching flux from the centre 38 to the permeable material on the other side of the structure. It will be seen that because the coils are mutually decoupled they operate substantially or completely independently, so the collective effect in operation of the structure is determined by superposition of the contribution of each individual coil.

FIG. 10 shows an example of a practical embodiment of a TPP magnetic structure. FIGS. 11, 12 and 13(c) show diagrammatic plan views and side elevations of the FIG. 10 structure, and corresponding reference numerals are used. The structure of these Figs. has three coils 41-43 arranged in a layer over a layer of magnetically permeable material 44 which may be continuous or discontinuous as described above. Again, a magnetic shield 45 may be provided. In this example the coils 41-43 are flat and each is wound as a spiral. Although the overall shape of the structure is circular, it will be appreciated that different shapes may be provided, and that the coils 41-43 may be provided in different shapes from those shown.

As described above, the coils 41-43 are overlapped in such a way that they are essentially decoupled i.e. they have minimal mutual coupling. In the TPP, the partial overlap of the three coils 41-43 determines the mutual decoupling between them. When one coil in a TPP is energized, the adjacent coil has EMF induced from the partially overlapped part of the coil and an EMF induced in the opposing direction from the rest of the coil. For example, if coil 41 in FIG. 11 was energised and induced an EMF in coil 43, the shaded part 46 of coil 41 which overlaps with coil 43 would induce an EMF in the opposite direction to the rest of the coil 41. The three coils achieve mutual decoupling by appropriately adjusting the overlap between the coils so that the net EMF induced in an adjacent coil is as close as possible to zero.

There is a portion 46 of each coil that overlaps the other. The overlap portion of each coil has adjacent turns of each coil spread or separated from each other as described in relation to the FIG. 8 and FIG. 9 examples above. A part 47 of the remaining non-overlapped portion of each coil has adjacent turns clumped tightly together so as to be immediately adjacent to each other, or on top of each other. Parts 47 are located near the edges of the TPP structure. The effect of having the turns in overlap portions 46 spread provides a high arching flux or field from the centre 48 of each coil to the permeable material in the remaining region of the pad structure beyond the coil i.e. to the region which includes the centres 38 of the other coils. To explain further, because the coils are mutually decoupled each coil 43 operates as if the other two coils were not present. Thus the field produced by coil 41 for example predominantly extends from the central region 38 of coil 41 over to the permeable material beyond the boundary of coil 41 i.e. the region including and between central regions 38 of the other coils.

Conversely, the clumped turns 47 at the edge portion of the structure create a low arching flux which returns to the permeable material through the relatively small marginal edge strip 50 of permeable material. The flux at the outer perimeter of the structure is thus constrained which minimises leakage flux. The result is that the predominant flux path formed by energisation of a winding is a high arching flux in the central region of the structure. As described above, the coils operate substantially or completely independently, so the collective effect in operation of the structure is determined by superposition of the contribution of each individual coil.

The magnetic structures discussed above in FIGS. 8-13 can be used interoperably for power transfer, or can be used with other structures. The multiple coil decoupled structures in particular can also provide effective coupling for power transfer under misalignment conditions with other magnetic structures. The non-numeric references in FIG. 13 identify various dimensions that may be used in practical embodiments or test set-ups. Table 1 below provides indicative dimensions in mm for two different CP and BPP pad sizes (CP1 and CP2, BPP1 and BPP2) and one TPP pad size.

TABLE 1

| VALUES OF THE LABELS FOR EACH OF THE PAD SIZINGS | | | | | |
| --- | --- | --- | --- | --- | --- |
| Labels | CP1 | CP2 | BPP1 | BPP2 | TPP |
| CU1 | 350 | 450 | 280 | 356 | 600 |
| CU2 | 4 | 4 | 4 | 4 | 4 |

TABLE 1-continued

VALUES OF THE LABELS FOR EACH OF THE PAD SIZINGS

| Labels | CP1 | CP2 | BPP1 | BPP2 | TPP |
|---|---|---|---|---|---|
| CU3 | 96 | 96 | 298 | 373 | 96 |
| CU4 | — | — | 8 | 8 | 6 |
| CU5 | — | — | 48 | 48 | 32 |
| FE1 | 350 | 450 | 280 | 356 | 670 |
| FE2 | 4 | 4 | 4 | 4 | 4 |
| FE3 | — | — | 450 | 576 | — |
| AL1 | 4 | 4 | 4 | 4 | 4 |
| OL | — | — | 50 | 74 | 96 |
| A1 | 1 | 1 | 1 | 1 | 1 |

Figure 14:
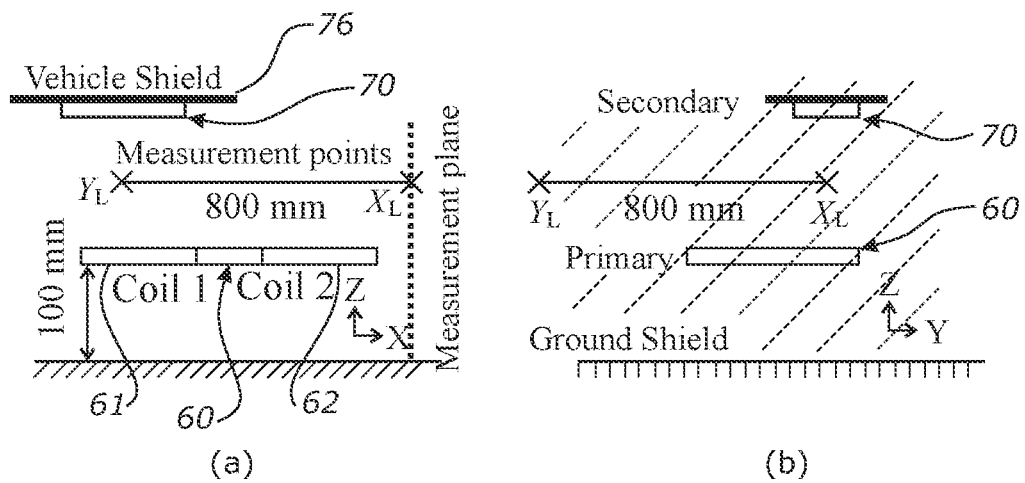

Misalignment will now be considered in the context of a multi-coil primary magnetic structure. FIG. 14 shows a diagram of misaligned pads in vertical cross section. Although this example relates to a ground primary pad and a secondary vehicle pad, it will be appreciated that the misalignment problem can occur in many other applications and contexts of which this situation is but one example.

FIG. 14(a) shows a cross section taken along the x axis, and FIG. 14(b) along the y axis. The pad structures are shown in FIG. 15(a) and (b) for the secondary and primary pads respectively. The physical dimensions for a practical system are shown in FIG. 15 and the measurements for a simulated system are shown in Table 2 below.

TABLE 2

DIMENSIONS OF THE BPP AND DDP PADS USED IN THIS STUDY IN mm

| | DDP | BPP | | DDP | BPP |
|---|---|---|---|---|---|
| $L_1$ | 340 | 700 | $C_2$ | 45 | 72 |
| $W_1$ | 260 | 520 | $C_3$ | 56 | 700 |
| $W_2$ | 200 | 250 | $H_1$ | 4 | 4 |
| $W_3$ | 69 | 214 | $H_2$ | 10 | 10 |
| $W_4$ | — | 172 | $H_3$ | 8 | 8 |
| $C_1$ | 170 | 430 | $H_4$ | 6 | 4 |

In this example, a BPP is used as the primary pad 60 which has two overlapping mutually decoupled coils 61 and 62. A magnetically permeable layer 64 is provided, and a magnetic shield 65. The secondary 70 comprises a Double D Pad (DPP) 70 having a structure as disclosed in international patent publication WO2010090539. The DDP has coils 72, a layer 74 of permeable material, and a shield 76 which may comprise part of a vehicle. The BPP is used to couple to one of two available mismatched and misaligned DDP coils. The primary BPP was sized as 700×520 mm with six quad filar windings, and the secondary DDP has dimensions of 340× 260 mm with either 2 or 7 turns. The coils (indicated by yellow and light blue areas) are made of copper, the ferrite in this example (represented by the dark grey area) comprises EPCOS N87 ferrite, and the shield (comprising aluminium) is shown by the light grey area.

As mentioned above, one of the advantages of the BPP is its ability to energise each coil individually. This allows the generation of either polarised or non-polarised magnetic fields simply by driving each coil out of, or in phase, respectively. The coils in the primary are also completely independent and therefore either one can be turned off (or disconnected) without impacting the tuning or operation of the other coil. If the coupling factor between it and the secondary pad is low (k<0:01) due to the secondary pad position. Each coil can also be energised with different non-zero currents at various phases. The primary pad size was chosen to achieve a suitable coupling profile over the full possible range of displacements between an aligned position and a misalignment of plus or minus (75, 100).

As the coils in the BPP can be operated independently, the scenario where only the closest coil in proximity to the secondary pad is chosen to be energised is called single coil operation, whereas scenarios where both coils are energised (at any phase) are described here as double coil operation. This specification investigates the effect of changing the operation of the BPP on both leakage flux and power outputs. Due to the symmetrical nature of the IPT pads, movements in the negative X direction are equivalent to those in the positive X direction and the same can be said of movements along the Y axis, thus only one quadrant needs to be analysed.

Coupling factor is also independent of the number of parallel winding turns (fillers) and the operating frequency of the pad. However the layout and volume of copper, combined with the presence and position of ferromagnetic and shielding materials, as well as the relative positions of the primary and secondary will affect it.

For the following description, the coils 61 and 62 in the primary BPP were labelled as coils 1 or 2 (FIG. 14). The DD coils 72 in the secondary DDP may be considered a single coil referred to as coil 3. Thus, coupling factor $k_{13}$ represents the coupling between coil 1 in the primary BPP and the secondary DDP, $k_{23}$ is the coupling between coils 2 and 3, and $k_{12,3}$ represents the effective coupling when both primary coils are energised, and are each coupling V A, to the secondary pad. An assumption of a single primary pad per vehicle, is also made in order to simplify the example.

Different operating conditions can enable transfer of the same uncompensated power from the primary BPP to the secondary DDP at any given position. This is best described by comparing the uncompensated VA which can be delivered from the BPP to the DDP as:

$$P_{SU} = V A_1 k_{13}^2 \pm V A_2 k_{23}^2$$

where $V A_1$ and $V A_2$ are the V A's of coil 1 or coil 2 in the BPP, respectively. This equation shows that as the secondary pad is misaligned, each primary coil in the BPP can be driven with varying V A's to deliver the same $P_{SU}$. However, as shown in FIG. 16, $k_{13}$ and $k_{23}$ are mirrored along the central axis. This means that except for certain positions (such as along the central line and at Y is approximately plus or minus 175 mm), one coil will be more coupled to the secondary than the other. Therefore it is possible to find a balance between the amount of V A each coil needs to deliver to the secondary to achieve the needed $P_{SU}$ for the required output power, by adjusting the current or phase in each coil based on the secondary coil topology and its relative position.

This is possible because the BPP is normally driven by two separate resonant inverters operating from a common DC bus. In the case where the secondary is a polarised structure (like the DDP), the most common operation, when the primary and secondary pads are reasonably well aligned, is to drive two BPP coils out of phase but with an identical current magnitude based on the demands of the secondary. However, under severe misalignment it is preferable to only operate with one coil energised. If a non-polarised secondary is used (such as a square or circular pad) then when the secondary is sufficiently well aligned, the two primary coils are driven in phase, usually with the same current magnitudes. Then again under severe misalignment only one coil can be used.

When the two BPP coils are operated identically, either in or out of phase, they are essentially configured as a DDP or square pad respectively. The V A across each coil is also similar when they are operated together like this, and the only difference is caused by slight variations in the reflected impedances presented to each by the secondary because of its misalignment. Consequently the double coil operation may be evaluated in practice by physically connecting the two independent coils in or out of phase. The two coils can then be driven using one inverter with a single tuning network to determine the actual effective coupling factor profiles. These two new coupling profiles called $k_{12,3,p}$, and $k_{12,3,np}$ (for polarised or non-polarised field generation), can be calculated using simulated or measured $k_{13}$'s and $k_{23}$'s as follows:

$$k_{12,3,e} = \left|\frac{k_{13} \pm k_{23}}{\sqrt{2}}\right|$$

This equation assumes that both coil 1 and 2 in the primary pad have near zero mutual coupling between each other, which is the case in normal operation. The coupling factors $k_{13}$ and $k_{23}$ have phases associated with them which means that if coil 1 and 2 generate opposing currents in the secondary pad, then the overall coupling factor, $k_{12,3}$, may be low based on the relative magnitude of the currents (which are position dependent).

The coupling factor profiles under each extreme mode of operation are shown for the case where a DDP is used as the secondary in FIG. 16. As expected this shows that over most of the displacement region, it is desirable to operate in either single coil, or polarised modes. The only region where non-polarised mode shows superior coupling factor is between X is approximately plus or minus (150-200) mm.

This can be shown when X=plus or minus 200 mm, where $k_{12,3}$, is lower than both $k_{13}$ and $k_{23}$. The "plus or minus" factor in the equation takes into account the phase excitation of the two coils so that if they are driven in phase (which is not ideal for an aligned polarised secondary), the two couplings are subtracted. Otherwise if the coils are driven out of phase, they are summed.

In practice, because two inverters are used to drive each coil independently, then the rate of power transfer to the secondary can be varied enabling the effective coupling to the secondary to appear anywhere within the extremes of the four coupling profiles shown, despite only $k_{13}$ and $k_{23}$ existing. However for the purposes of this specification, the operation of the BPP at the extreme conditions (either as double coil with a common current or under single current mode) will be evaluated. In the case where the BPP primary coils are operated with a common current magnitude but with phases with at 0 or 180 degrees the field shapes and couplings to the secondary are essentially identical to that of a square pad or DDP primary and uncompensated power can be described as:

$$P_{SU} = V A_{12} k_{12,3}^2$$

where $V A_{12}$ represents the combined VA of the two primary pad coils 1 and 2 exactly as if they are connected together and energised with a common $I_1$. For single coil operation, the earlier equation should be used but in this case either V $A_1$ or V $A_2$ is zero as one coil is turned off, however, it is also important to note that with this operation the maximum V A of the BPP is also effectively halved compared to double coil operation because of the maximum copper and ferrite ratings of each coil.

Due to a change in primary inductance and coupling in either single or double coil operation, different primary currents are required to couple constant secondary $P_{SU}$ for both cases. For example, at the (0,100) position, $k_{13,s,p}$=0: 168, and $k_{12,3,s}$=0:234, so $k_{12,3}$=$k_{13}$=1:39.

Furthermore, the existing primary BPP coils each have an inductance of 25uH in double coil operation, the total primary inductance is 50 uH. Thus primary current needs to be 2:78 times higher in a single coil system compared to a double coil system in order to couple the same $P_{SU}$.

This increase in current will change the magnetic loss distribution in the pads as the circuit quality factor of the primary pad $Q_1$ and pad quality factor $Q_L$ changes. The leakage flux will also change as the primary pad topology changes from a polarised to a non-polarised field shape.

A method for controlling a primary IPT circuit having a multiple coil primary magnetic coupling structure may thus include determining the variation in coupling factor relative to misalignment between the primary magnetic coupling structure and a secondary magnetic coupling structure; and energising one or more coils of the primary magnetic coupling structure dependent on the relative alignment of the coupling structures to maximise coupling. The method may be used to maximise power transfer for a given misalignment. The method may include energising the coils of the primary magnetic coupling structure in a polarised manner. The method may include energising the coils of the primary magnetic coupling structure in a non-polarised manner.

Another approach comprises detecting misalignment between a secondary magnetic coupling structure relative to a primary magnetic coupling structure; and energising one or more coils of the primary coupling structure in a polarised or non-polarised manner dependent on the detected misalignment. The method may include determining the variation in coupling factor relative to misalignment between the primary magnetic coupling structure and a secondary magnetic coupling structure. Once the variation is known the method may include energising one or more coils of the primary magnetic coupling structure dependent on the relative alignment of the coupling structures to maximise coupling.

Leakage flux density refers to the RMS magnitude of the magnetic flux density to which people may be exposed in an IPT system. Since people are unlikely to be directly underneath a vehicle when it is charging, the areas of concern tend to be further away, in this case around 800 mm from the centre of the secondary pad. This measurement point is chosen for comparative purposes so that IPT systems can be fairly measured against each other. The actual position and magnitude of the maximum leakage flux on this plane will vary with pad topology, size, operation and misalignment.

Leakage flux density for an IPT system with a fixed power output, at a constant secondary circuit quality factor, is independent of the winding technique providing the position of each wire is essentially the same and the average current in each winding is identical when comparing a multi-filar pad and a single-filar pad. This is because a six turn quad-filar pad will require four times the current to deliver the same VA to the secondary pad as a 24 turn single filar pad. Practical limitations such as component sensitivity, as well as maximum operating voltages and currents limit the frequencies at which IPT systems can operate.

In order to determine the effect that the operation of the secondary has on the leakage flux when delivering power, various simulations were undertaken with a constant $I_1$ in the primary pad and the secondary current ($I_{coil}$) was then increased to represent an increase in $Q_2$, which is effectively an increase in load. $I_1$ was fixed at 27:69 A in order to have comparable results with practical measurements. $I_{coil}$ was varied for a series tuned secondary system as $Q_2$ rises from 0 to 10.

The results of the simulations are presented in Table 3 and show that leakage flux $X_{LN,12,3}$ and $X_{LN,13}$ does not increase significantly with respect to $Q_2$. This is particularly true in double coil operation showing that most of the leakage flux is produced by the primary pad with misaligned mismatched IPT systems, as a result of the relative proximities of the flux generating coils in the primary and secondary pads to the measurement point. As such, the primary pad contributes more leakage flux compared to the secondary pad whose flux contribution amounts to an increase of 2.4% as $Q_2$ reaches 10.

TABLE 3

SIMULATED LEAKAGE FLUX ALONG X AXIS AT 800 mm FOR A FIXED I = 27.69 A AS $Q_2$ VARIES AT THE MOST MISALIGNED POSITION OF (-250.100) MM

| | | $VA_{12}$ = 20.5 kVA | | $VA_1$ = 10.2 kVA | |
| --- | --- | --- | --- | --- | --- |
| $Q_2$ | $I_{coil}$ (A) | $X_{LN,12,3}$ (µT) | $P_{o.12,3}$ (W) | $X_{LN,13}$ (µT) | $P_{o,13}$ (W) |
| 0 | 2.44 | 28.17 | 0 | 14.96 | 0 |
| 1 | 3.45 | 28.17 | 166 | 15.49 | 239 |
| 2 | 5.45 | 28.19 | 332 | 15.88 | 479 |
| 3 | 7.72 | 28.23 | 498 | 16.31 | 719 |
| 4 | 10.07 | 28.28 | 664 | 16.76 | 959 |
| 5 | 12.45 | 28.35 | 829 | 17.22 | 1198 |
| 6 | 14.85 | 28.42 | 995 | 17.70 | 1438 |
| 7 | 17.26 | 28.51 | 1061 | 18.17 | 1678 |
| 8 | 19.68 | 28.61 | 1327 | 18.64 | 1917 |
| 9 | 22.11 | 28.73 | 1403 | 19.11 | 2157 |
| 10 | 24.53 | 28.86 | 1658 | 19.58 | 2396 |

However, when the primary pad is only using one coil to transfer power at this misaligned position (which is the coil that has the highest coupling to the secondary pad), the effect of $Q_2$, and therefore $I_{coil}$ on the leakage flux is much more pronounced given the exposed primary coil closest to the measurement point is turned off.

The total leakage flux is then much smaller but grows by 30% as the secondary $Q_2$ increases from 0 to 10.

In summary this evaluation shows that in the misaligned condition the measured leakage is swamped by the leakage flux generated by the primary pad in double coil operation and that the secondary leakage is low. Consequently, operating the secondary with low V A is not desirable as it forces the primary V A higher, exacerbating losses and leakage. This is discussed further below.

Table 3 also shows that when the primary BPP operates in single coil mode, it has half the V A compared to double coil operation (when the same $I_1$ is applied). Despite this, the higher coupling factor which exists between the primary and secondary pad in single coil mode causes the output power for the same circuit $Q_2$ to not only be higher, but the leakage flux to also be lower.

If the desire were to try and increase the primary pad size to increase the tolerance of the system to movement, this will move the leakage flux measurement point closer to the main flux paths, so that the exposure may be higher. However, if the coupling factor increases, a lower primary current may be used to deliver the desired power. This trade off needs careful evaluation in practice in order to find the best design.

A practical validation shown in Table 3 shows that as $Q_2$ (and therefore V $A_2$) increases, the efficiency of the overall system also increases. This is because V $A_1$ decreases for a given $P_{out}$, enabling the loss to be shifted appropriately and highlighting the need for a secondary regulator. In cases where the output current is uncontrolled, a higher secondary circuit $Q_2$ will cause $I_1$, and thus $Q_1$, to decrease significantly and thus the increased magnetic losses in the secondary are offset by lower losses in the primary magnetics. However in a case where secondary rectification and control is required to maintain a steady output current, higher $Q_2$s will also add additional losses to the secondary system.

These results show that the leakage flux decreases as $Q_2$ increases for a given power level. The results also show that the tuning topology has little significant impact on the leakage flux produced by a mismatched IPT system if $Q_2$ is sufficiently large.

In practice an IPT system may thus be controlled by operating the secondary magnetic coupling structure at or close to a VA limit of the secondary magnetic coupling structure in order to lower the VA requirement of the primary magnetic coupling structure. Operating the secondary magnetic coupling structure in such a way as to lower or minimise the VA requirement of the primary magnetic coupling structure reduces leakage flux that would be produced if the primary VA requirement were to increase.

The operating method can include monitoring a thermal loading condition of the secondary magnetic coupling structure and operating the secondary magnetic coupling structure at or near a maximum thermal loading condition of the secondary magnetic coupling structure.

Alternatively, the control method may reside in adjusting the Q factor of the secondary magnetic coupling structure to maintain the secondary magnetic coupling structure at or near a maximum thermal loading condition of the secondary magnetic coupling structure.

The methods discussed above for operating the secondary at or near its thermal limit in order to minimise leakage flux are applicable to IPT systems generally and are not limited to multiple coil structures.

The invention claimed is:

1. A magnetic coupling structure for wireless power transfer comprising:
   a plurality of flat coils, each coil comprising a plurality of turns of conductive material;
   each coil having an overlap portion that overlaps another of the flat coils, and a non-overlap portion; and
   the overlap portions being selected such that there is minimal mutual coupling between the coils;
   wherein a plurality of turns in the overlap portion have a greater relative spacing therebetween than those turns in the non-overlap portion.

2. The structure as claimed in claim 1 wherein the structure further comprises a magnetically permeable material, and the plurality of flat coils are arranged on a side of the magnetically permeable material with the plurality of flat coils provided in a first layer and the magnetically permeable material provided in a second layer.

3. The structure as claimed in claim 2 wherein the structure further comprises a magnetically permeable material, and the permeable material is configured to direct magnetic flux generated or received by a coil predominantly away from the non-overlap portion of that coil.

4. The structure as claimed in claim 2 wherein the permeable material extends beyond the periphery of the coils.

5. The structure as claimed in claim 2 wherein a first region of the permeable material is provided exteriorly of the non-overlap portion and a second region of the permeable material is provided exteriorly of the overlap portion, and the area of the second region is greater than the area of the first region.

6. The structure as claimed in claim 1 wherein the magnetic coupling structure is configured to concentrate the magnetic flux predominantly in a central region of the magnetic coupling structure.

7. The structure as claimed in claim 1 wherein the magnetic coupling structure is configured to concentrate magnetic flux predominantly about the overlap portion.

8. The structure as claimed in claim 1 wherein a sub-region of the non-overlap portion has turns with a lesser relative spacing therebetween than those turns in the overlap portion.

9. The structure as claimed in claim 1 wherein adjacent turns or filars are spaced relatively more closely to each other in a part of the non-overlap portion nearest to an end or edge of the coupling structure.

10. A method of wireless power transfer, the method comprising the steps of:
   energising a first coil of the flux coupling structure;
   detecting a voltage or current induced in a second coil of the flux coupling structure from energisation of the first coil;
   using the detected voltage or current to determine the mutual coupling between the first and second coils; and
   energising the first and/or second coils to provide a magnetic field for wireless power transfer dependent on the determined mutual coupling.

11. The method as claimed in claim 10 comprising transferring power, wirelessly, to a receiver coil of a secondary wireless power transfer system, and estimating the mutual coupling, between the first coil and the second coil of the flux coupling structure, in the presence of an impedance reflected from the receiver coil.

12. The method as claimed in claim 11 comprising estimating the position of the secondary wireless power transfer system, relative to the flux coupling structure, from the impedance reflected from the receiver coil.

13. The method as claimed in claim 11 comprising using the detected voltage or current to quantify the mutual coupling between the second and third coils.

14. The method as claimed in claim 13 comprising compensating for the mutual coupling to transfer a substantially constant and/or required power to the secondary by increasing or reducing the energisation of the first and/or second coils.

15. A method for controlling a primary IPT circuit having a multiple coil primary magnetic coupling structure, the method comprising:
   determining a variation in coupling between the primary magnetic coupling structure and a secondary magnetic coupling structure; and
   energising one or more coils of the primary magnetic coupling structure dependent on the variation in coupling between the primary magnetic coupling structure and a secondary magnetic coupling structure;
   wherein the method comprises detecting a location of the secondary magnetic coupling structure relative to the primary magnetic coupling structure from the variation in coupling between the primary magnetic coupling structure and the secondary magnetic coupling structure, and controlling the primary supply responsive to the location of the secondary magnetic coupling structure.

16. The method as claimed in claim 15 comprising determining an optimal or near optimal effective coupling factor for a plurality of different locations of the secondary magnetic coupling structure relative to the primary magnetic coupling structure.

17. The method as claimed in claim 15 comprising energising the coils of the primary magnetic coupling structure in a polarised manner.

18. The method as claimed in claim 13 comprising energising a single coil of the primary magnetic coupling structure in a non-polarised manner, wherein the single coil is selected, from the multiple coils of the primary magnetic coupling structure, to provide the best coupling factor with the secondary magnetic coupling structure.

19. The method as claimed in claim 15 comprising estimating an effective coupling factor for the magnetic coupling structure, wherein the effective coupling factor comprises an overall coupling factor for multiple coils.

20. The method as claimed in claim 15 comprising determining the variation in coupling, between the primary magnetic coupling structure and a secondary magnetic coupling structure, from a nominal coupling when the primary magnetic coupling structure and a secondary magnetic coupling structure are optimally aligned.

* * * * *